US009951632B2

(12) United States Patent
Waldman et al.

(10) Patent No.: US 9,951,632 B2
(45) Date of Patent: Apr. 24, 2018

(54) HYBRID BONDED TURBINE ROTORS AND METHODS FOR MANUFACTURING THE SAME

(71) Applicant: HONEYWELL INTERNATIONAL INC., Morristown, NJ (US)

(72) Inventors: David R Waldman, Chandler, AZ (US); Don Mittendorf, Mesa, AZ (US); Mark C. Morris, Phoenix, AZ (US); Michael Vinup, Phoenix, AZ (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 0 days.

(21) Appl. No.: 14/806,933

(22) Filed: Jul. 23, 2015

(65) Prior Publication Data

US 2017/0022827 A1    Jan. 26, 2017

(51) Int. Cl.
*B23K 20/00*    (2006.01)
*F01D 5/30*    (2006.01)
(Continued)

(52) U.S. Cl.
CPC ............ *F01D 5/3061* (2013.01); *B23K 5/003* (2013.01); *B23K 5/14* (2013.01); *B23K 9/167* (2013.01);
(Continued)

(58) Field of Classification Search
CPC . F01D 5/3061; F01D 5/063; B23K 2201/001; B23K 20/1205
(Continued)

(56) References Cited

U.S. PATENT DOCUMENTS 3,778,188 A    12/1973    Aspinwall
3,940,268 A    2/1976    Catlin
(Continued)

FOREIGN PATENT DOCUMENTS

DE    10361882 A1    7/2005
EP    0503697 B1    9/1992
(Continued)

OTHER PUBLICATIONS

Henderson, M.B. et al.;l Nickel-Based Superalloy Welding Practices for Industrial Gas Turbine Applications; ALSTOM Power Technology Centre, Whetstone, UK; available online at http://citeseerx.ist.psu.edu/viewdoc; 2004.
(Continued)

*Primary Examiner* — Erin B Saad
(74) *Attorney, Agent, or Firm* — Lorenz & Kopf, LLP

(57) ABSTRACT

Hybrid bonded turbine rotors and methods for manufacturing the same are provided. A method for manufacturing a hybrid bonded turbine rotor comprises the steps of providing turbine disk having a rim portion comprising a live rim of circumferentially continuous material and a plurality of live rim notches in an outer periphery of the turbine disk alternating with a plurality of raised blade attachment surfaces defining the outer periphery; providing a plurality of turbine blades, each of which comprising an airfoil portion and a shank portion, the shank portion having a base surface; metallurgically bonding a compliant alloy material layer to either or both of the raised blade attachments surfaces of the turbine disk and the base surfaces of the blade shanks; and linear friction welding the plurality of blades to the turbine disk so as to form a bond plane between the raised blade attachments surfaces of the turbine disk and the base surfaces of the blade shanks, the compliant alloy material layer being disposed at the bond plane.

13 Claims, 11 Drawing Sheets

(51) Int. Cl.

| | | |
|---|---|---|
| *B23K 20/12* | (2006.01) | |
| *B23K 20/22* | (2006.01) | |
| *B23K 20/02* | (2006.01) | |
| *B23K 20/14* | (2006.01) | |
| *B23K 20/08* | (2006.01) | |
| *B23K 9/167* | (2006.01) | |
| *B23K 9/23* | (2006.01) | |
| *B23K 5/14* | (2006.01) | |
| *B23K 5/00* | (2006.01) | |
| *B23K 10/02* | (2006.01) | |
| *B23K 15/00* | (2006.01) | |
| *B23K 26/32* | (2014.01) | |
| *B23K 26/21* | (2014.01) | |
| *F01D 5/08* | (2006.01) | |
| *F01D 5/34* | (2006.01) | |
| *F01D 11/00* | (2006.01) | |
| *B23K 103/08* | (2006.01) | |

(52) U.S. Cl.
CPC ............... *B23K 9/23* (2013.01); *B23K 10/02* (2013.01); *B23K 15/0046* (2013.01); *B23K 15/0093* (2013.01); *B23K 20/02* (2013.01); *B23K 20/023* (2013.01); *B23K 20/08* (2013.01); *B23K 20/1205* (2013.01); *B23K 20/14* (2013.01); *B23K 20/22* (2013.01); *B23K 26/21* (2015.10); *B23K 26/32* (2013.01); *F01D 5/082* (2013.01); *F01D 5/34* (2013.01); *F01D 11/006* (2013.01); *B23K 2203/08* (2013.01); *F05D 2230/239* (2013.01); *F05D 2300/606* (2013.01); *F05D 2300/607* (2013.01); *Y02T 50/671* (2013.01); *Y02T 50/673* (2013.01); *Y02T 50/676* (2013.01)

(58) Field of Classification Search
USPC .......................... 228/112.1, 2.1, 114, 262.3
See application file for complete search history.

(56) References Cited

U.S. PATENT DOCUMENTS

| | | | |
|---|---|---|---|
| 4,008,052 A | | 2/1977 | Vishnevsky |
| 4,096,615 A | | 6/1978 | Cross |
| 4,135,851 A | | 1/1979 | Bill et al. |
| 4,152,816 A | | 5/1979 | Ewing |
| 4,314,794 A | | 2/1982 | Holden et al. |
| 4,326,835 A | | 4/1982 | Wertz |
| 4,335,997 A | | 6/1982 | Ewing |
| 4,478,789 A | * | 10/1984 | Nilsson ............... B22F 3/15 264/319 |
| 4,529,452 A | | 7/1985 | Walker |
| 4,581,300 A | | 4/1986 | Hoppin |
| 4,587,700 A | | 5/1986 | Curbishley et al. |
| 4,650,399 A | | 3/1987 | Craig |
| 4,680,160 A | | 7/1987 | Helmink |
| 4,784,573 A | | 11/1988 | Ress, Jr. |
| 4,907,947 A | | 3/1990 | Hoppin |
| 5,061,154 A | | 10/1991 | Kington |
| 5,071,059 A | | 12/1991 | Heitman et al. |
| 5,106,266 A | | 4/1992 | Barns |
| 5,113,583 A | | 5/1992 | Jenkel |
| 5,609,471 A | | 3/1997 | Frasier et al. |
| 5,823,745 A | | 10/1998 | Anderson, III et al. |
| 5,836,742 A | | 11/1998 | Dierksmeier et al. |
| 5,865,364 A | | 2/1999 | Trask et al. |
| 6,106,233 A | | 8/2000 | Walker |
| 6,291,086 B1 | | 9/2001 | Nguyen-Dinh |
| 6,383,312 B1 | * | 5/2002 | Konter ............... C22C 1/0433 148/410 |
| 6,524,072 B1 | | 2/2003 | Brownell |
| 6,551,372 B1 | | 4/2003 | Ewing et al. |
| 6,558,114 B1 | | 5/2003 | Tapley et al. |
| 6,616,408 B1 | | 9/2003 | Meier |
| 6,666,653 B1 | | 12/2003 | Carrier |
| 6,969,238 B2 | | 11/2005 | Groh et al. |
| 6,969,240 B2 | | 11/2005 | Strangman |
| 7,334,997 B2 | | 2/2008 | Karafillis |
| 7,435,049 B2 | | 10/2008 | Ghasripoor et al. |
| 7,731,075 B2 | | 6/2010 | Bray |
| 7,766,623 B2 | | 8/2010 | Chou et al. |
| 7,824,152 B2 | | 11/2010 | Morrison |
| 7,832,986 B2 | | 11/2010 | Baker et al. |
| 7,874,793 B2 | | 1/2011 | Razzell et al. |
| 7,900,351 B2 | | 3/2011 | Koehler et al. |
| 8,007,244 B2 | | 8/2011 | Deakin et al. |
| 8,070,448 B2 | | 12/2011 | Morris et al. |
| 8,206,119 B2 | | 6/2012 | Liotta et al. |
| 8,251,651 B2 | | 8/2012 | Propheter-Hinckley et al. |
| 8,266,800 B2 | | 9/2012 | Segletes et al. |
| 8,382,120 B2 | | 2/2013 | Deo et al. |
| 8,449,255 B2 | | 5/2013 | Tadayon et al. |
| 8,613,138 B2 | | 12/2013 | Chin et al. |
| 8,650,753 B2 | | 2/2014 | Sellars et al. |
| 8,777,583 B2 | | 7/2014 | Darkins, Jr. et al. |
| 8,821,122 B2 | | 9/2014 | Borufka |
| 8,876,466 B2 | | 11/2014 | Pattinson et al. |
| 8,882,442 B2 | | 11/2014 | Smarsly et al. |
| 2006/0168808 A1 | | 8/2006 | Lin |
| 2006/0239825 A1 | | 10/2006 | Rice et al. |
| 2006/0255099 A1 | | 11/2006 | Balbach et al. |
| 2008/0304974 A1 | | 12/2008 | Marshall |
| 2009/0269193 A1 | | 10/2009 | Larose et al. |
| 2009/0304514 A1 | | 12/2009 | Izadi et al. |
| 2010/0023150 A1 | | 1/2010 | Cai et al. |
| 2011/0031299 A1 | * | 2/2011 | Bray ............... B23K 20/12 228/112.1 |
| 2011/0097599 A1 | * | 4/2011 | Hu ............... B32B 15/01 428/680 |
| 2011/0255991 A1 | | 10/2011 | Borufka et al. |
| 2011/0305578 A1 | * | 12/2011 | Smarsly ............. B23K 20/1205 416/223 R |
| 2012/0279066 A1 | | 11/2012 | Chin |
| 2013/0101866 A1 | | 4/2013 | Piegert |
| 2013/0108427 A1 | | 5/2013 | Brassine et al. |
| 2014/0072715 A1 | | 3/2014 | Jones et al. |
| 2014/0212284 A1 | | 7/2014 | Jamison et al. |
| 2015/0354358 A1 | | 12/2015 | Grande |
| 2016/0289855 A1 | | 10/2016 | Task |

FOREIGN PATENT DOCUMENTS

| | | |
|---|---|---|
| EP | 2075411 A1 | 7/2009 |
| GB | 2237758 A | 5/1991 |
| JP | 2013202624 A | 10/2013 |
| WO | 2010094273 A2 | 8/2010 |
| WO | 2015021086 A1 | 2/2015 |
| WO | 2015038274 A1 | 3/2015 |

OTHER PUBLICATIONS

Antonio M. Mateo Garcia (2011). BLISK Fabrication by Linear Friction Welding, Advances in Gas Turbine Technology, Dr. Ernesto Benini (Ed.), ISBN: 978-953-307-611-9, InTech, Available from: http://www.intechopen.com/books/advances-in-gas-turbine-technology/blisk-fabrication-by-linear-frictionwelding.

Michael E. Nunn; Aero Engine Improvements Through Linear Friction Welding; WI Ltd, Granta Park, Great Abington, Cambridge, CB21 6AL, United Kingdom, Copyright © 2014 TWI Ltd. All rights reserved.

Partial EP Search Report for Application No. 15195060.7-1702 dated Jun. 21, 2016.

Extended EP Search Report for Application No. 15195060.7-1702 / 3053694 dated Oct. 26, 2016.

USPTO Office Action for U.S. Appl. No. 14/551,293 dated Jan. 27, 2017

(56) References Cited

OTHER PUBLICATIONS

USPTO Office Action for U.S. Appl. No. 14/551,293 dated Jul. 14, 2017.

* cited by examiner

HYBRID BONDED TURBINE ROTORS AND METHODS FOR MANUFACTURING THE SAME

TECHNICAL FIELD

The present invention generally relates to gas turbine engines, and more particularly relates to hybrid bonded turbine rotors and methods for manufacturing the same.

BACKGROUND

Gas turbine engines may be used to power various types of vehicles and systems, such as air or land-based vehicles. In typical gas turbine engines, compressed air generated by axial and/or radial compressors is mixed with fuel and burned, and the expanding hot combustion gases are directed along a flowpath and through a turbine nozzle having stationary vanes. The combustion gas flow deflects off of the vanes and impinges upon turbine blades of a turbine rotor. A rotatable turbine disk or wheel, from which the turbine blades extend, spins at high speeds to produce power. Gas turbine engines used in aircraft use the power to draw more air into the engine and to pass high velocity combustion gas out of the gas turbine aft end to produce a forward thrust. Other gas turbine engines may use the power to turn a propeller or an electrical generator.

Compressor discharge (T3) and turbine inlet (T4.1) temperatures continue to rise (advanced gas turbine engines will significantly benefit from compressor discharge temperatures in the 1,200-1,400° F. range with turbine inlet temperatures well above 3,000° F.) to enable improved engine cycle efficiencies. Increased temperatures at the turbine disk rim and stress/temperature combinations well above the metallurgical limit of the conventional turbine rotor result, limiting turbine rotor life and hindering engine cycle improvement options. For example, a conventional turbine rotor using an insertable fir-tree design for attaching the turbine blades of a single crystal (SC) alloy to the turbine disk of a powder metal (PM) alloy may not be strong enough to sustain high speed stresses at the higher T3 and T4.1 temperatures, and the turbine disk may not be capable of attaining adequate life at rim temperatures above 1,300 to 1,400° F. In addition, such conventional turbine rotors are expensive to manufacture, susceptible to detachment or separation of the turbine disk due to high stress/temperature combinations, and there is a potential for turbine blade walking (axial dislocation of the turbine blade in the disk).

Another conventional turbine rotor includes individual SC turbine blades brazed or diffusion bonded together to form a blade ring that is subsequently brazed or diffusion bonded to the PM turbine disk. There are inherent metallurgical problems with brazing or diffusion bonding the SC turbine blades to the PM turbine disk as these bonding techniques are performed at high temperatures and may compromise the microstructure of the turbine disk. In addition, the multiple high temperature thermal cycles from bonding and heat treatment will likely result in grain growth in the turbine disk alloy, thus compromising low cycle fatigue (LCF) behavior in the disk hub. Diffusion bonding can also lead to the formation of deleterious interface phases from the diffusion of elements from one alloy to the other from several hours of high temperature exposure. Bond plane phases can be distributed in such a manner as to compromise strength and toughness. Conventional diffusion bonding or brazed approaches for attaching the turbine blades to the turbine disk in the conventional turbine rotor may also form carbides at the SC to PM bond plane, leading to a brittle bond joint and a subsequent reduced allowable design temperature and stress.

Moreover, diffusion bonding may require a high temperature vacuum environment. For diffusion bonding the turbine blades in an economical way, the turbine blades may be bonded simultaneously in a vacuum furnace. However, the mechanical loading on the turbine blades to press them into the turbine disk and hold them securely during simultaneous bonding is a challenging undertaking. The forces required for the diffusion bonding are very large, the tooling is expensive, and the resulting bonding may cause distortion in the resulting turbine rotor. In addition, a diffusion bonding process may compromise protective coatings on the turbine blades, so any protective coatings must be applied to the turbine blades in a potentially difficult non-line of sight process after diffusion bonding.

Hence, there is a need for hybrid bonded turbine rotors and methods for manufacturing the same. There is also a need for hybrid bonded turbine rotors that can withstand higher compressor discharge (T3) and turbine inlet (T4.1) temperatures, enabling improved engine cycle efficiencies and turbine rotor life, thereby resulting in reductions in specific fuel consumption and turbine rotor weight and cost. There is an additional need for methods for manufacturing the hybrid bonded turbine rotors in which suitable metallurgical properties of the turbine disk and turbine blades are maintained.

BRIEF SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

Hybrid bonded turbine rotors and methods for manufacturing the same are provided. A method for manufacturing a hybrid bonded turbine rotor comprises the steps of providing turbine disk having a rim portion comprising a live rim of circumferentially continuous material and a plurality of live rim notches in an outer periphery of the turbine disk alternating with a plurality of raised blade attachment surfaces defining the outer periphery; providing a plurality of turbine blades, each of which comprising an airfoil portion and a shank portion, the shank portion having a base surface; metallurgically bonding a compliant alloy material layer to either or both of the raised blade attachments surfaces of the turbine disk and the base surfaces of the blade shanks; and linear friction welding the plurality of blades to the turbine disk so as to form a bond plane between the raised blade attachments surfaces of the turbine disk and the base surfaces of the blade shanks, the compliant alloy material layer being disposed at the bond plane.

Furthermore, other desirable features and characteristics of the hybrid bonded turbine rotor, and the method for manufacturing the same will become apparent from the subsequent detailed description and the appended claims, taken in conjunction with the accompanying drawings and the preceding background.

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

Various embodiments are directed to hybrid bonded turbine rotors and methods for manufacturing the same. In particular, this invention makes use of one or more "compliant" alloy material layers disposed at the bond plane between the blades and the disk of the turbine rotor to assist in linear friction welding the blades to the disk. The hybrid bonded turbine rotors according to exemplary embodiments of the present invention eliminate rotor failures due to turbine disk detachment or separation and turbine blade walking, enable disk rim temperatures to safely operate at temperatures exceeding 1500° F., and enable increased T3 and T4.1 temperatures to support future cycle requirements, improving turbine rotor performance. The hybrid bonded turbine rotor according to exemplary embodiments of the present invention provides a reduction in specific fuel consumption and turbine rotor weight and cost and has an optimized metallurgical microstructure. The optimized metallurgical microstructure optimizes the mechanical properties in the turbine disk bore for burst and fatigue, the turbine disk rim for high temperature creep/fatigue, and the turbine blades for stress rupture, oxidation, and thermo-mechanical fatigue.

Figure 1:
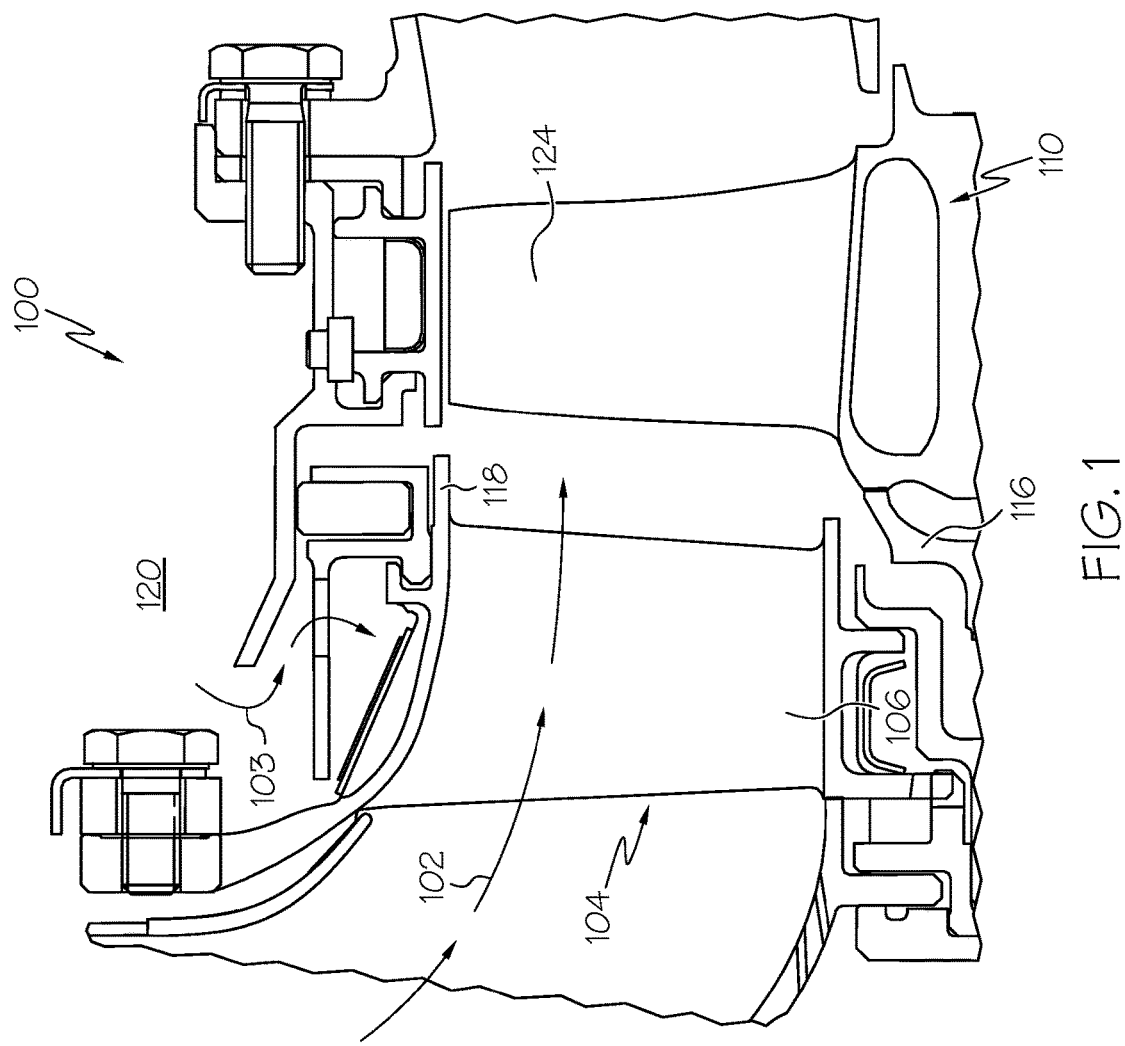
FIG. 1 is a cross-sectional side view of a turbine section of an exemplary gas turbine engine.

FIG. 1 is a cross-sectional side view of a portion of a turbine section 100 of an exemplary gas turbine engine. The turbine section 100 receives high temperature (e.g., a temperature typically in the range of about 1100 to 1800° C.) gases (hereinafter "hot combustion gases") (arrow 102) from an upstream engine combustor (not shown) to produce energy for the engine and/or components coupled to the engine. The turbine section 100 includes a turbine nozzle 104 that has a plurality of static vanes 106 (only one of which is shown in FIG. 1) that direct the gases from the combustor to a hybrid bonded turbine rotor 110 (partially shown in FIG. 1). According to an embodiment (e.g., FIG. 2), the hybrid bonded turbine rotor 110 includes a plurality of turbine blades 124 (only one of which is shown in FIG. 1) that utilize a forward sealing plate 116. When the turbine blades 124 are impinged upon by the gases, the gases cause the hybrid bonded turbine rotor 110 to spin. An outer circumferential wall 118 may surround the static vanes 106 and defines a portion of a plenum 120. The plenum 120 receives cooling air (arrow 103) from a compressor section (not shown), which may be directed through one or more openings in the outer circumferential wall 118 to cool the static vanes 106.

Referring again to FIG. 2 and now to FIGS. 3 through 6B, according to exemplary embodiments of the present invention, the hybrid bonded turbine rotor 110 is depicted. The hybrid bonded turbine rotor 110 generally comprises a turbine disk 122 (depicted in isolation in FIG. 7) and the plurality of turbine blades 124 (a single turbine blade is depicted in isolation in FIGS. 8 and 9) radially extending therefrom, each turbine blade 124 individually bonded on an outer periphery of the turbine disk 122 to define a bond plane 126 (FIGS. 3 through 6B) at a selected radial position. Either or both of the turbine blade 124 and turbine disk 122 include a compliant layer metallurgically bonded thereto (layers 127 and 129, respectively), as will be discussed in greater detail below. The hybrid bonded turbine rotor 110 further comprises a shank cavity 128 (FIGS. 6A and 6B) between each pair of adjacent turbine blades (more particularly between shank portions of adjacent turbine blades as hereinafter described). The hybrid bonded turbine rotor 110 comprises two different alloys for the disk 122 and the blade 124, respectively (i.e., a hybrid), each having different metallurgical properties as hereinafter described, as well as a third or further alloy for the compliant layer(s) 127 and/or 129. The compliant layers 127 may be applied (metallurgically bonded) to the blade 124 to provide an interface material that better matches the plasticity of the disk material. Alternatively, the compliant layer 129 may be applied (metallurgically bonded) to the disk 122 to provide an interface material that better matches the plasticity of the blade material. Still another embodiment utilizes compliant materials 127 and 129 that are metallurgically bonded to both the blade 124 and disk 122, respectively, such that the bond plane 126 is between identical materials.

In accordance with exemplary embodiments of the present invention, each turbine blade 124 of the plurality of turbine blades in the hybrid bonded turbine rotor 110 is individually metallurgically bonded to the turbine disk 122 at the bond plane 126 that is above a live rim 130 (FIGS. 4 through 6A and 7) of the turbine disk 122 as hereinafter described, wherein one or both of the blade 124 and disk 122 have the compliant layer 127/129 metallurgically bonded thereto to facilitate bonding at the bond plane 126. While 38 individual turbine blades are depicted as metallurgically bonded to the turbine disk in the depicted hybrid bonded turbine rotor 110 of FIG. 2, it is to be understood that there may be a fewer or greater number of turbine blades in the hybrid bonded turbine rotor 110.

Figure 10:
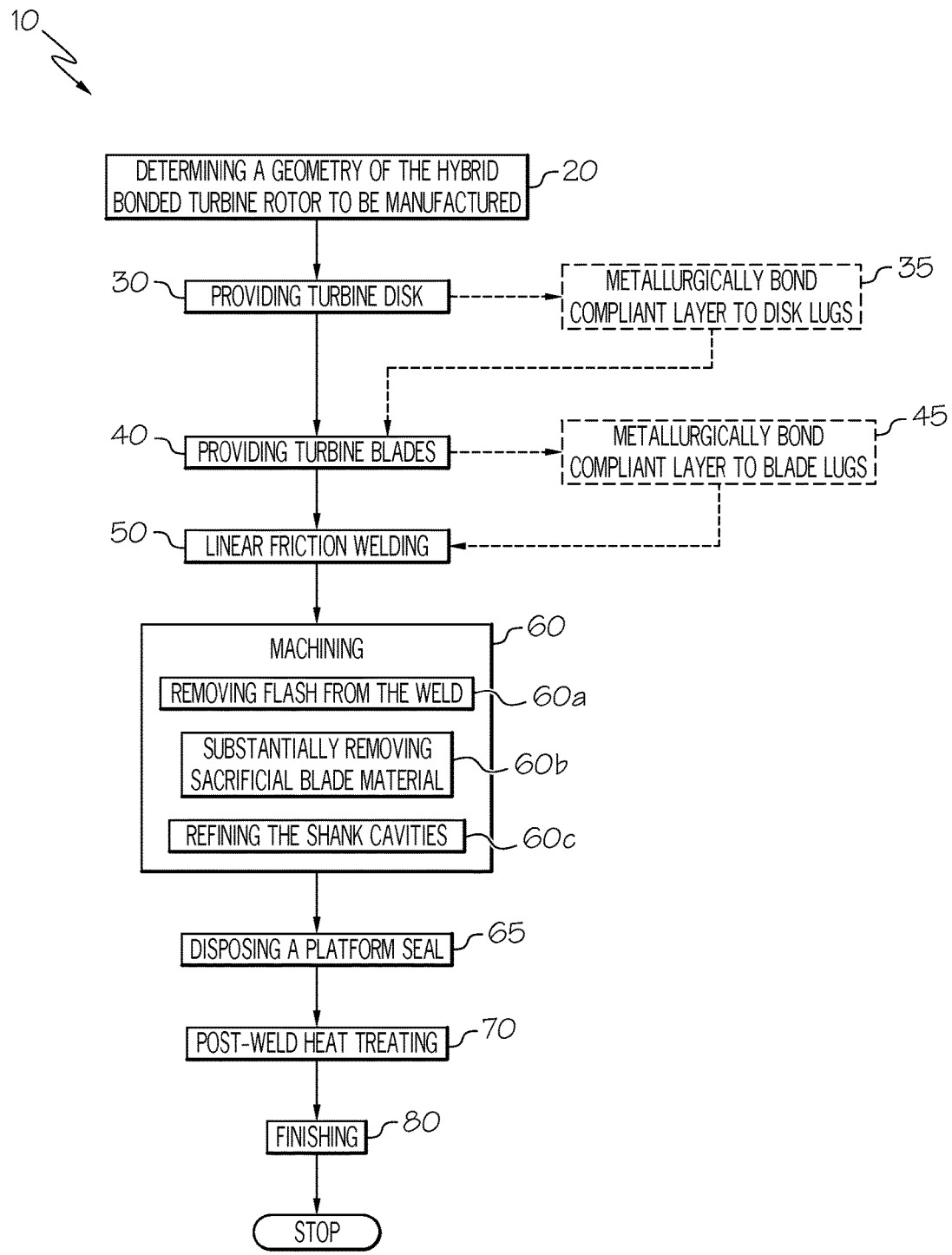
FIG. 10 is a flow chart of a method for manufacturing the hybrid bonded turbine rotor of FIG. 2 according to exemplary embodiments of the present invention.

Referring now to FIG. 10, according to exemplary embodiments of the present invention, a method 10 for manufacturing the hybrid bonded turbine rotor according to exemplary embodiments of the present invention begins by determining a geometry of the hybrid bonded turbine rotor 110 to be manufactured that will provide predetermined stress and temperature combinations that will result in a predetermined life for the hybrid bonded turbine rotor (step 20). As used herein, the "geometry" to be determined includes a radius of the live rim 130 (a "live rim radius"), a fillet radius of a plurality of live rim notches 138 as hereinafter described, and the selected radial position for the bond plane 126 of the hybrid bonded turbine rotor manufactured according to exemplary embodiments of the present invention as described herein. The selected radial position, the live rim radius, and the fillet radius of the plurality of live rim notches (i.e., the geometry of the hybrid bonded turbine rotor 110 to be manufactured) are determined using commercially available thermal and stress analysis methods as is known to those skilled in the art (such as NX Thermal by Siemens and ANSYS thermal and stress analysis programs) such that they provide the predetermined stress and temperature combinations that result in the predetermined life for the hybrid bonded turbine rotor.

The selected radial position for the bond plane 126 (e.g., FIGS. 6A and 6B) is above the live rim 130 of the turbine disk 122. The selected radial position for the bond plane 126 may be determined using a stress analysis optimization technique, such as by finite element computational analysis as is known to those skilled in the art. The selected radial position for the bond plane 126 depends upon an optimized stress and temperature prediction combination to balance the peak bore stress/temperature combination with the peak live rim notch stress/temperature combination to achieve acceptable disk burst, fatigue, and creep life at both locations. In addition, the selected radial position of the bond plane is disposed where the stress analysis provides an average (and preferably the peak) bond plane stress prediction of less than parent material yield strength at a temperature of about 1000° F. to about 1500° Fahrenheit (° F.). The bond plane 126 is preferably as far radially outward as the stress and temperature thereat will allow for acceptable life. The determining step 20 may be performed at any time prior to the providing steps 30 and 40 as hereinafter described.

Figure 2:
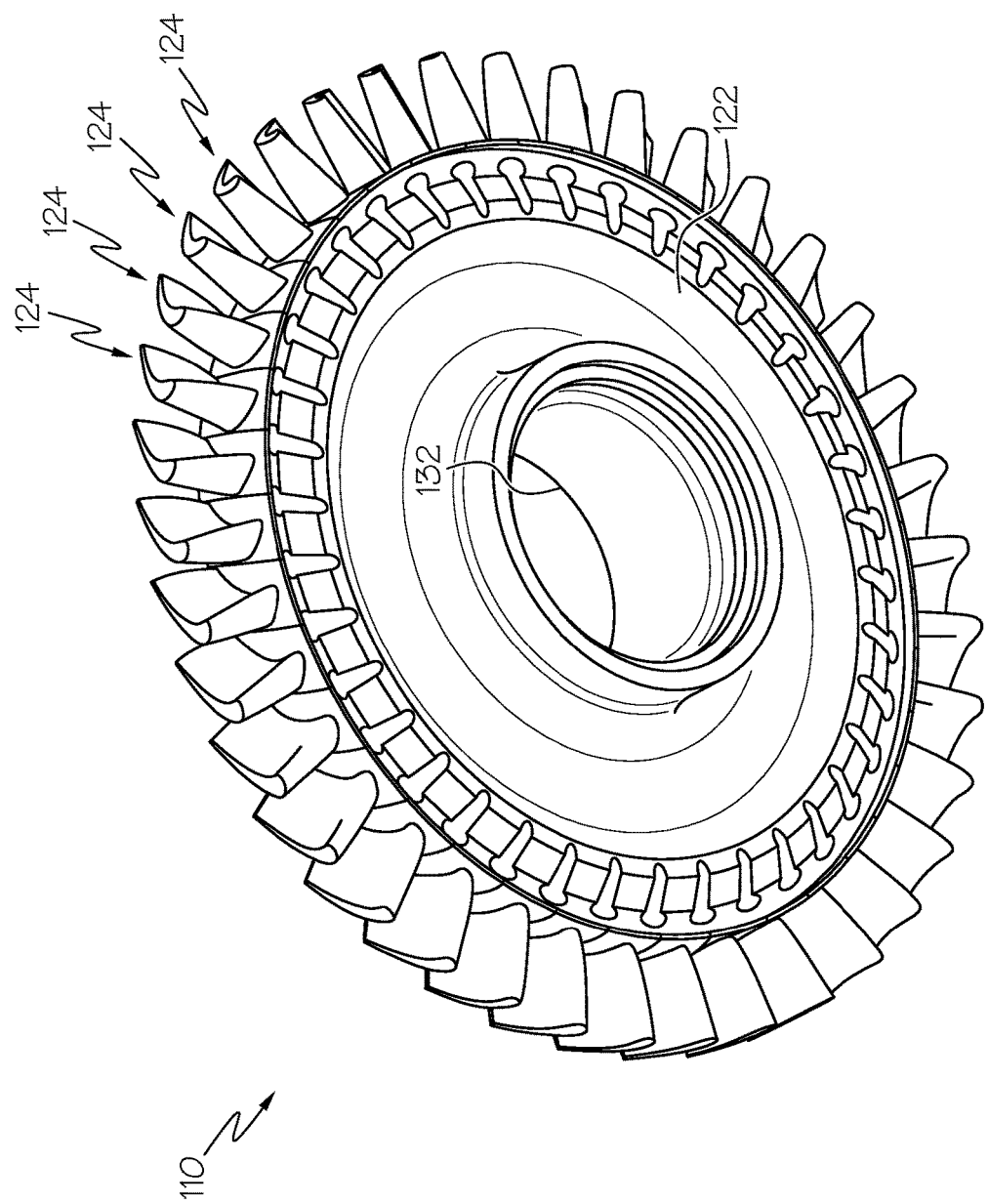
FIG. 2 is an isometric view of a hybrid bonded turbine rotor manufactured according to exemplary embodiments of the present invention.
Figure 3:
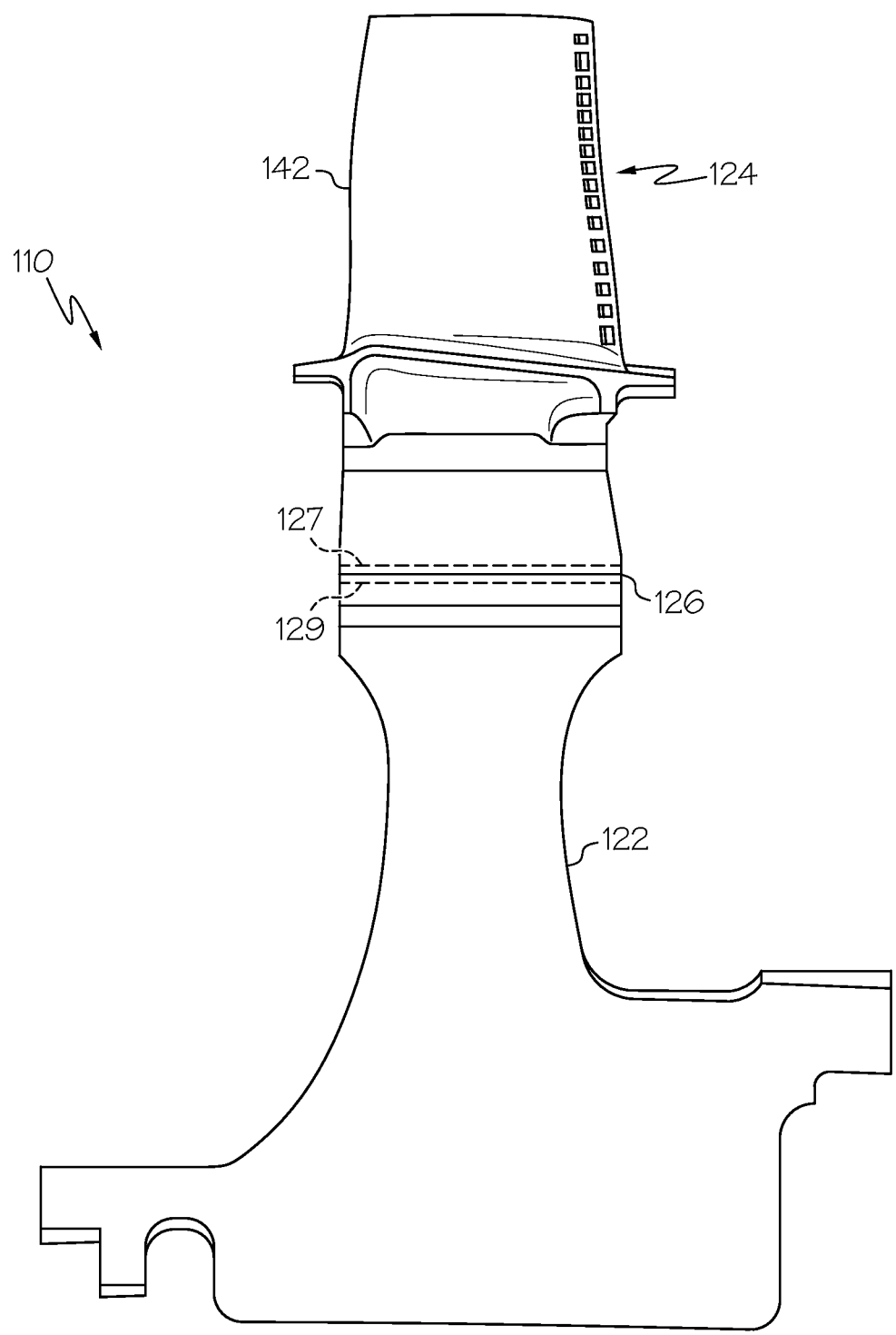
FIG. 3 is a perspective side view of a portion of the hybrid bonded turbine rotor of FIG. 2 including a turbine blade metallurgically bonded to a blade attachment surface of a turbine disk with one or more compliant layers, according to exemplary embodiments of the present invention.
Figure 4:
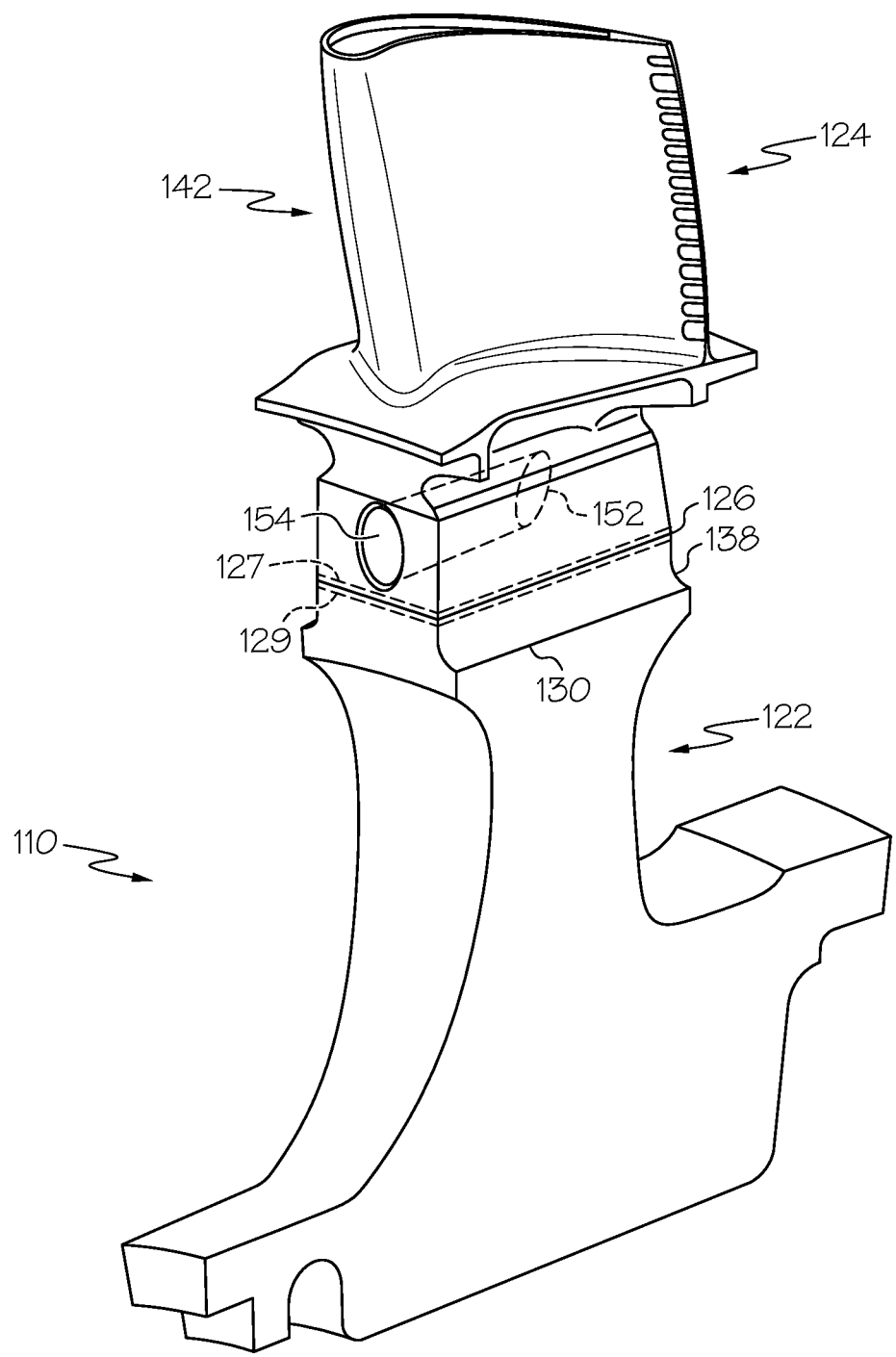
FIG. 4 is another view of the hybrid bonded turbine rotor portion of FIG. 3, depicting a cooling air supply feed channel (dotted lines) formed in a shank portion of the turbine blade and extending from an inlet opening disposed in a front face of the shank portion toward a rear face thereof.
Figure 5:
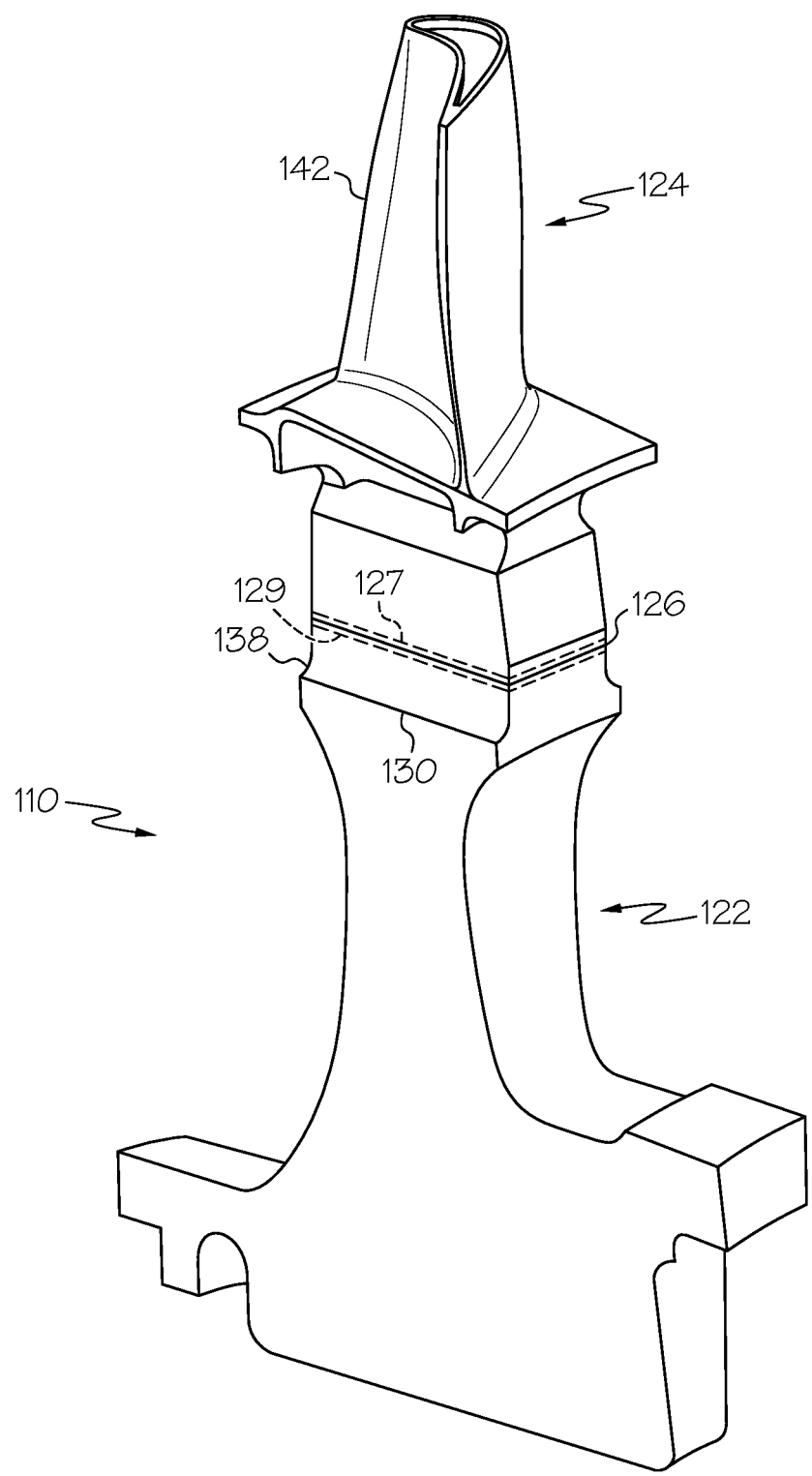
FIG. 5 is another view of the hybrid bonded turbine rotor portion of FIGS. 3 and 4, depicting one of the side faces and the rear face of the turbine blade shank portion.
Figure 7:
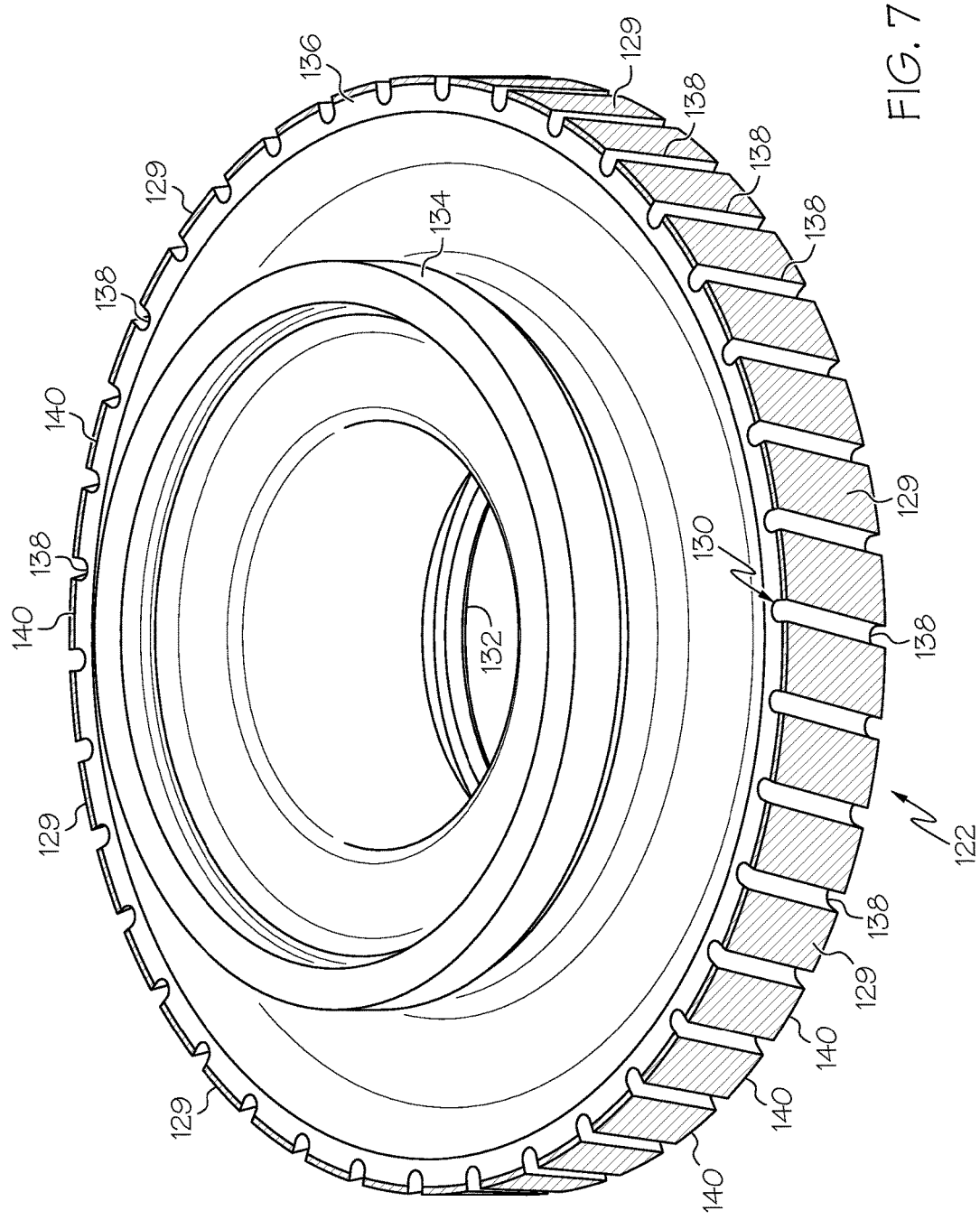
FIG. 7 is an isometric view of the turbine disk of FIGS. 2 through 6B in isolation with a compliant layer metallurgically bonded thereto, according to exemplary embodiments of the present invention.

The method 10 for manufacturing the hybrid bonded turbine rotor such as depicted in FIG. 2 continues by providing the turbine disk 122 (such as depicted in FIG. 7) (step 30). The turbine disk may be formed, for example, by forging, heat treating, and machining to a pre-weld condition as known in the art. The heat treating may include a sub-solvus or super-solvus heat treatment or may comprise a combination of sub-solvus heat treatment in the region of a turbine disk bore 132 to obtain optimal fine grain size low cycle fatigue and burst properties and a simultaneous super-solvus heat treatment in the live rim region 130 to obtain optimal larger grain high temperature properties. The turbine disk 122 provided in step 30 may include the plurality of live rim notches as depicted, for example, in FIG. 7 or the live rim notches may be formed in a subsequent machining step (more particularly, during a flash removing sub-step or a cavity refining sub-step thereof) as hereinafter described. The turbine disk provided in step 30 has the geometry determined in step 20.

Optional step 35 follows from step 30, and includes metallurgically bonding the compliant layer 129 to the attachment surfaces 140. FIG. 7 shows the present invention where a compliant material layer 129 is metallurgically bonded to the powder metal disk lugs at the surface 140. In this embodiment, the layer 129 may comprise nickel base superalloys that are single crystal aligned with the (001) direction consistent with the blade 124 and with a composition that will produce a gamma prime volume fraction similar to the blade alloy, i.e., within +/−20%, or within +/−10%. In other embodiments, a compliant friction weldable layer 129 may comprise nickel or cobalt base polycrystalline superalloys that are similar in high temperature strength and plastic behavior to the blade alloy rather than the disk alloy to promote enhanced bonding. Methods to deposit the compliant layer 129 include solid state diffusion bonding with HIP or axial load vacuum furnace, transient liquid phase bonding, fusion cladding (TIG, MIG, electron beam and laser), explosive bonding, HVOF and plasma spray or other suitable methods that produce a robust metallurgical bond.

Figure 6A:
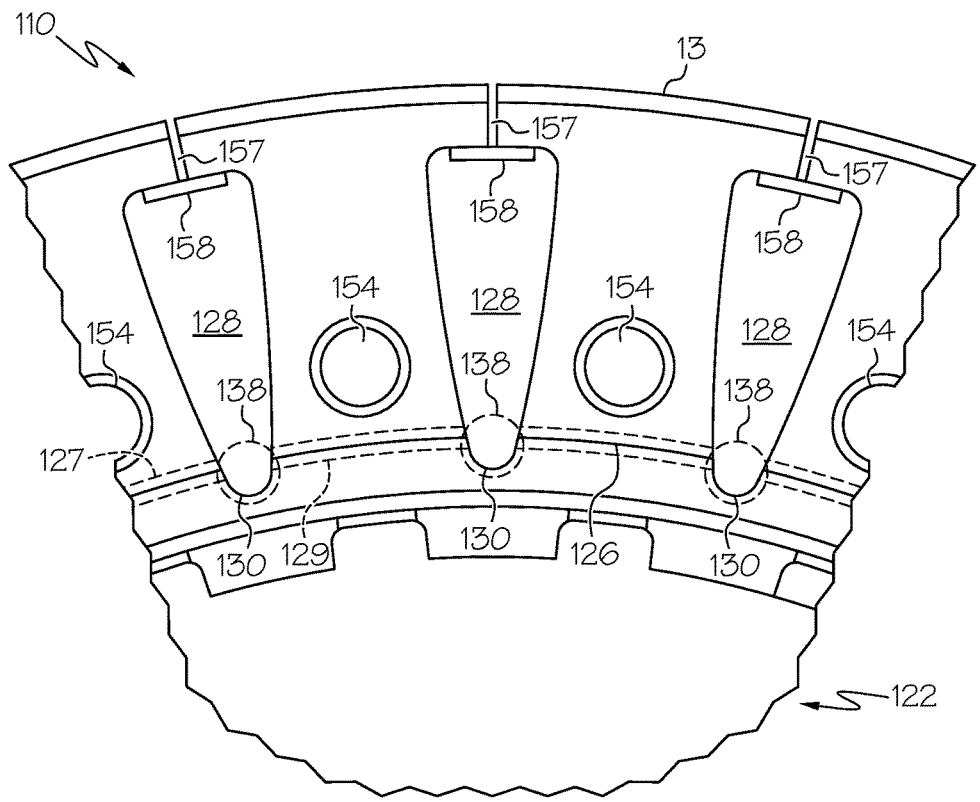
FIG. 6A is a partial front view of the hybrid bonded turbine rotor of FIG. 2, depicting four circumferentially adjacent turbine blades (the turbine blade airfoils not shown and two of the four turbine blades partially shown), each turbine blade metallurgically bonded to the corresponding blade attachment surface of the turbine disk with one or more compliant layers forming a bond plane above a live rim of the turbine disk.
Figure 11:
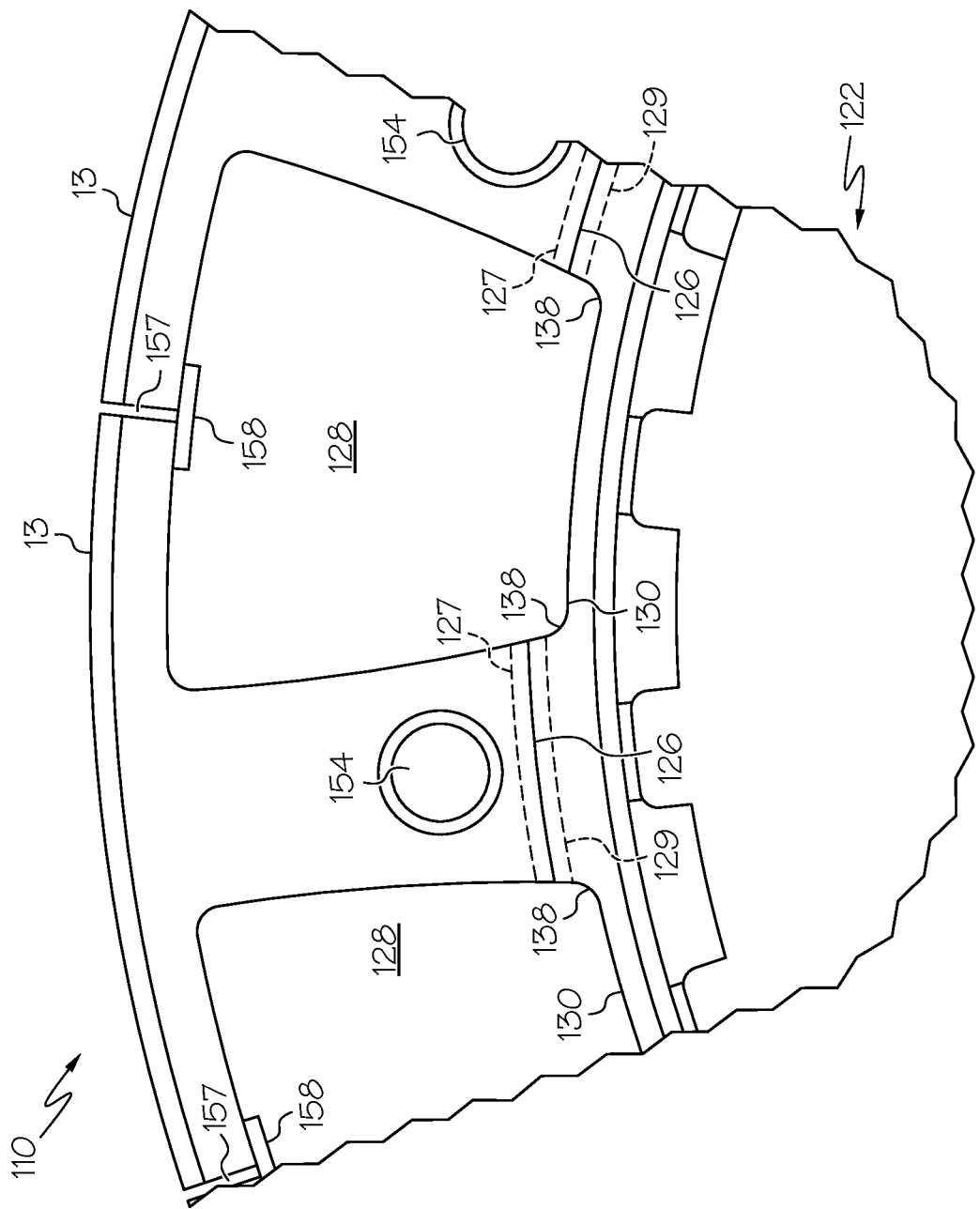
FIG. 11 is a partial front view of a hybrid bonded turbine rotor in an alternative embodiment, depicting three circumferentially adjacent turbine blades (the turbine blade airfoils not shown and two of the three turbine blades partially shown), each turbine blade metallurgically bonded to the corresponding blade attachment surface of the turbine disk with one or more compliant layers forming a bond plane above the live rim of the turbine disk.

Continuing with FIG. 7, the turbine disk 122 has the centrally-formed bore 132 defined by an inner hub portion 134. The turbine disk 122 also includes an outer rim portion 136. In accordance with exemplary embodiments of the present invention, the outer rim portion 136 comprises the live rim 130 of circumferentially continuous material and a plurality of live rim notches 138 in an outer periphery of the turbine disk alternating with a plurality of raised blade attachment surfaces 140 defining the outer periphery. The most outward portion of the outer rim portion having circumferentially continuous material which is uninterrupted by the peripheral live rim notches, is referred to as the "live rim" 130. The live rim radius is determined in step 20 as previously described. The live rim notches of the turbine disk provided in step 30 may have a stress-relieving configuration (i.e., the shape and contour (radius of curvature) of the live rim notches are optimized for hoop stress reduction.). Alternatively, the stress-relieving configuration of the live rim notches may not be provided until the machining step as hereinafter described. In either case, the fillet radius of the live rim notches is determined in step 20 as previously described. The live rim notch between adjacent raised blade attachment surfaces may be fully filleted on both sides bridging adjacent raised blade attachment surfaces as depicted in FIG. 6A. In an alternate embodiment as depicted in FIG. 11, adjacent raised blade attachment surfaces may be separated by a tangential distance that is larger than the fillet radius of the live rim notch. In the alternate embodiment, the fillets of each live rim notch are separated by a tangential distance/are at a radial dimension of the live rim radius (the centerline of the arc is the engine centerline and the radius curvature of the arc is the live rim radius). The shank cavities 128 include the live rim notches 138 and extend radially outwardly from the live rim 130 to radially inwardly of the blade platform (more particularly, to the bottom surface (i.e., an inner surface) of the blade platform. As noted previously, the live rim notches 138 are located below the bond plane 126 and above the live rim 130, minimizing stress concentration proximate the bond plane. The live rim notches preferably minimally extend below the bond plane. The live rim notches may be used to collect and remove the flash that forms during the linear friction welding step. The raised blade attachment surfaces 140 may be substantially flat as depicted, cylindrical, conical, or other shapes that are determined to provide the desired stress/temperature combination that results in the desired life of the hybrid bonded turbine rotor according to exemplary embodiments. In addition, the blade attachment surfaces have a height that permits the bond plane to be at the optimal radial location determined in step 20.

The turbine disk 122 is formed from a first alloy selected from the class of alloys known as powdered metal (PM) alloys. A suitable exemplary PM alloy for the turbine disk includes a nickel-based alloy (including a nickel-based superalloy) or the like. A PM alloy with dual microstructure maybe employed to optimize high temperature performance of the outer rim portion 136 of the turbine disk and tensile/burst properties and low cycle fatigue strength (LCF) at turbine disk bore locations (the bore 132). In the dual microstructure turbine disk, the outer rim portion 136 has larger grains for high temperature creep resistance while the inner hub region 134 has smaller grains for optimal tensile/burst strength and (LCF) life. In other embodiments, the PM alloy does not have a dual microstructure. In still other embodiments, a forged disk may be used that is not fabricated from powder metal (PM).

Figure 8:
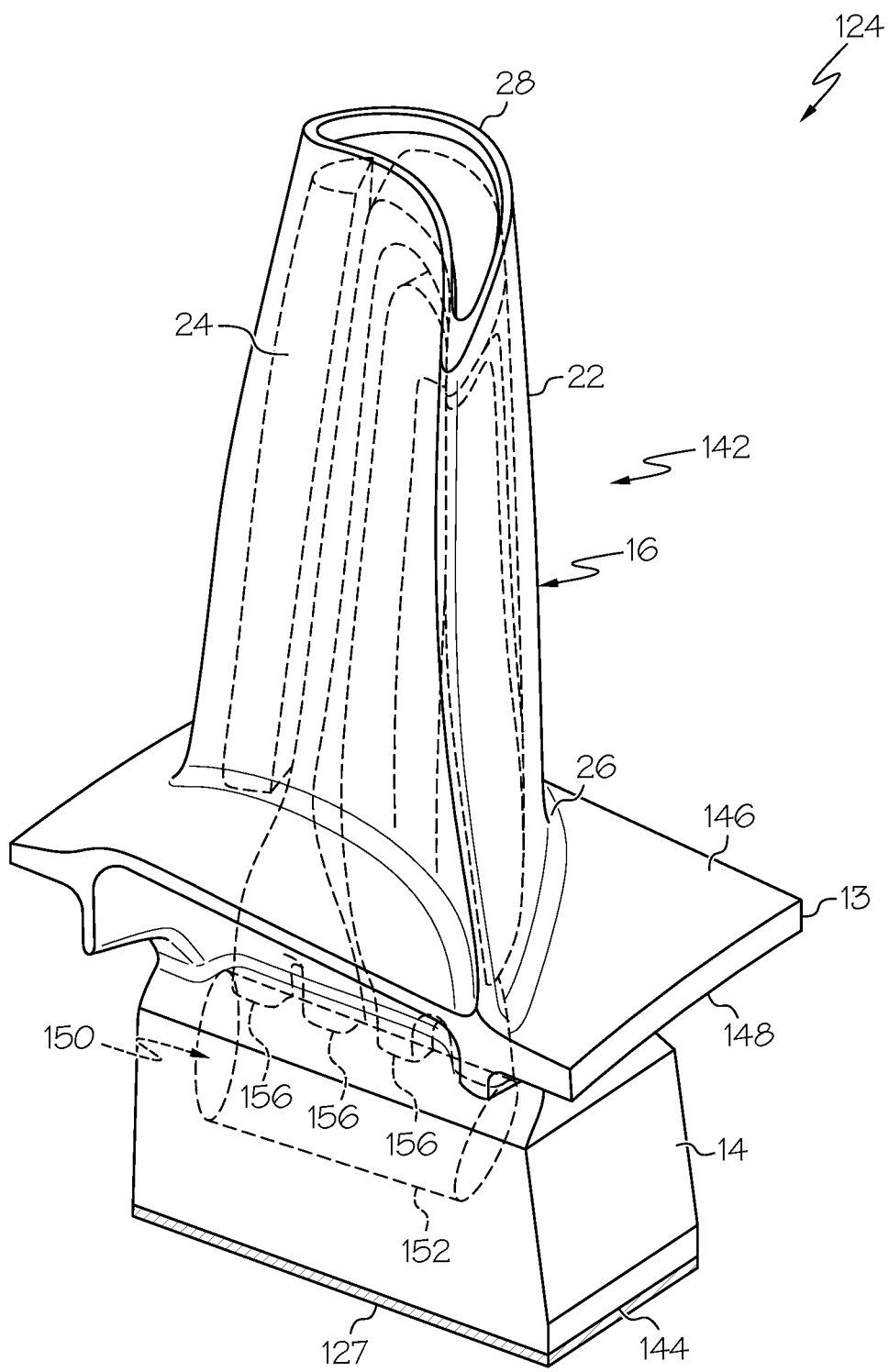
FIG. 8 is an isometric view of one of the individual turbine blades of the hybrid bonded turbine rotor of FIGS. 2 through 6B with a compliant layer metallurgically bonded thereto, looking from the aft, according to exemplary embodiments of the present invention.
Figure 9:
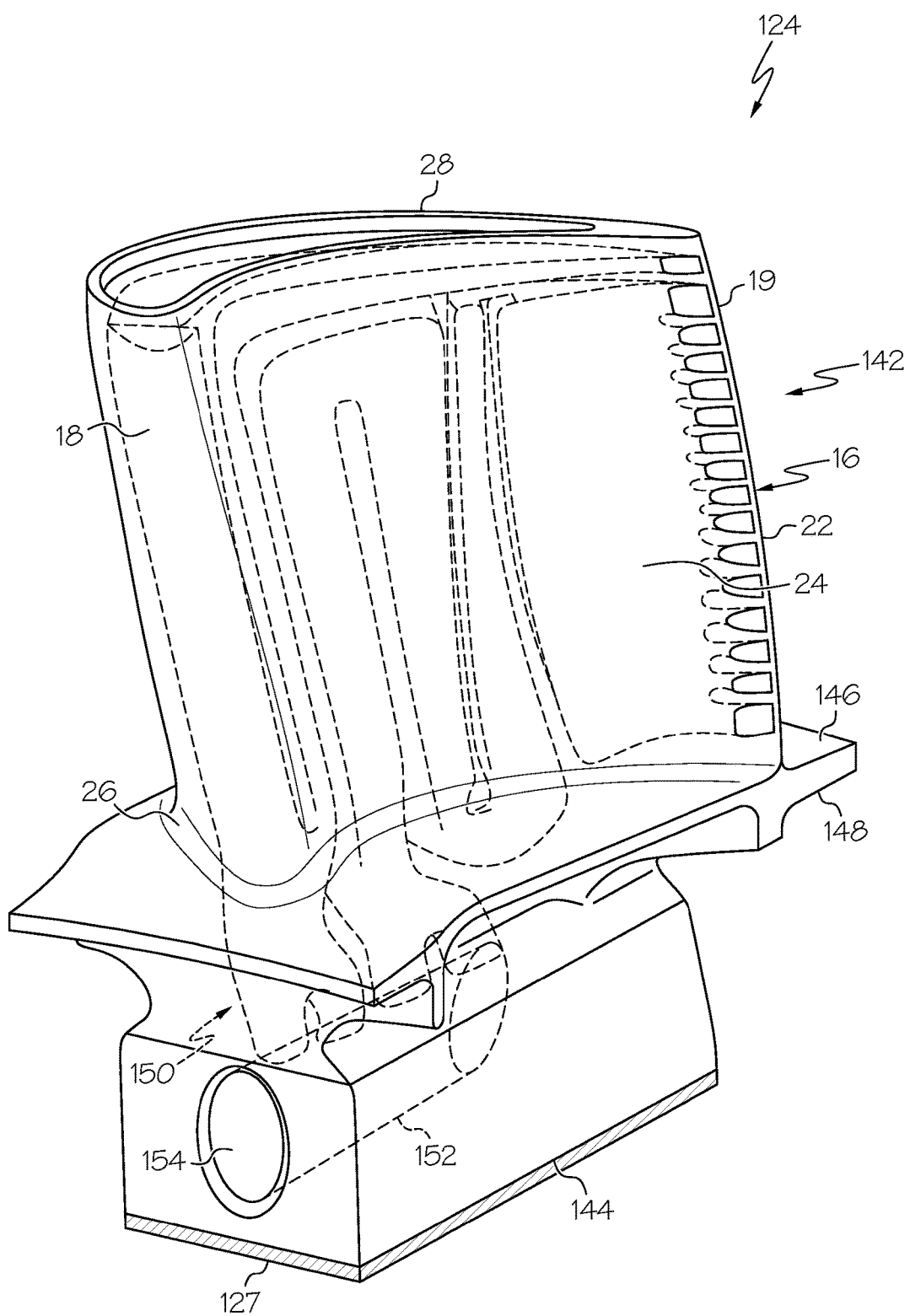
FIG. 9 is an isometric view of one of the individual turbine blades of the hybrid bonded turbine rotor of FIGS. 2 through 6B with a compliant layer metallurgically bonded thereto, looking from the front, according to exemplary embodiments of the present invention.

Referring now to FIGS. 8 and 9 and still referring to FIG. 10, according to exemplary embodiments of the present invention, method 10 for manufacturing the hybrid bonded turbine rotor continues by providing the plurality of turbine blades (step 40) (as exemplified by the turbine blade 124 depicted in FIGS. 8 and 9). While step 40 is described as performed after step 30 (and optionally step 35), it is to be understood that step 40 may be performed prior to or simultaneously with step 30. As used herein, a "turbine blade" 124 includes a single turbine blade as depicted in FIGS. 8 and 9 or a multiplet such as a doublet (two turbine blades that are integrally formed as a single-piece unitary structure) (not shown). The step of providing the plurality of turbine blades may comprise forming the turbine blades. The turbine blades may be formed by casting as known in the art. The cast turbine blades may be heat treated, machined, and optionally coated to a pre-weld condition. For example, the turbine blades may be solution heat treated and aged to obtain optimal high temperature creep and fatigue strength. The pre-weld heat treatment may include a homogenized and solution heat treatment but may also include full heat treatment with homogenization, solution heat treatment, and precipitation aging thermal cycles. The step of providing the plurality of turbine blades (step 40) may further comprise optionally coating the individual turbine blades 124 with a protective coating material prior to a linear friction welding step 50 as hereinafter described. The protective coating material may be an oxidation resistant coating, a corrosion resistant coating, a thermal barrier coating, or combinations thereof, applied in a manner well known to one skilled in the art. Optionally coating the turbine blades may be performed prior to, simultaneously with, or after step 30 of providing the turbine disk. The turbine blade surfaces to be welded are then prepared in a manner to remove oxides that may have formed from thermal and/or coating processes. The oxides may be removed by machining, grinding, chemical etching, or other methods known to those skilled in the art.

Optional step 45 follows from step 40, and includes metallurgically bonding the compliant layer 127 to the blade base 144. FIGS. 8 and 9 show the present invention where a compliant material layer 127 is metallurgically bonded to the turbine blade 124 base 144. In this embodiment, a compliant friction weldable layer 127 may comprise nickel or cobalt base superalloys that are similar in high temperature strength and plastic behavior to the disk alloy rather than the blade alloy. Methods to deposit the compliant layer 127 include solid state diffusion bonding with hot iso-static press (HIP) or axial load vacuum furnace, transient liquid phase bonding, fusion cladding via tungsten inert gas (TIG) or metal inert gas (MIG) or electron beam or laser welding, explosive bonding, high velocity oxygen fuel (HVOF), plasma spray, or other suitable methods that produce a robust metallurgical bond.

As further shown in FIGS. 8 and 9, each of the turbine blades 124 comprises an airfoil portion 142 that protrudes outwardly from a shank portion 14. The shank portion 14 includes the base 144 for metallurgical bonding of the turbine blade 124 to the corresponding raised blade attachment surface 140 of the turbine disk 122 as hereinafter described. A blade platform 13 may be disposed between the airfoil portion 142 and the shank portion 14, i.e., the airfoil portion 142 extends radially outwardly from an outer surface 146 of the blade platform 13 and the shank portion 14 extends radially inwardly from an inner surface 148 (also known as a bottom surface) of the blade platform. The blade platform isolates the outer rim portion 136 (FIG. 7) of the turbine disk from the hot combustion gases (arrow 102 in FIG. 1). The shank portion 14 is under the blade platform but above the bond plane 126 (e.g., FIG. 6A). The turbine blades 124 may include an integral shroud (not shown) such that the turbine blade and shroud are a one-piece unitary structure. The turbine blade itself may alternatively be unshrouded. The airfoil portion 142 of each turbine blade comprises the airfoil 16 having leading and trailing edges 18 and 19, suction and pressure sides 22 and 24, and a root 26 and a tip 28. The turbine blades 124 may include sacrificial material (oversized root stock) (not shown for ease of illustration) for clamping or holding the turbine blade during the linear friction welding machine operation as hereinafter described (i.e., the sacrificial material serves as a clamping surface for the tooling used in the linear friction welding operation).

The turbine blades 124 may comprise a single crystal alloy or a directionally solidified alloy (a "second alloy"). The turbine blades may be cast by casting methods well known in the art. As used herein, a "single crystal alloy" is an alloy in which substantially the entire alloy has a single crystallographic orientation, without the presence of high angle grain boundaries. A small amount of low angle grain boundaries such as tilt, or twist boundaries are permitted within such a single crystal article but are preferably not present. However, such low angle boundaries are often present after solidification and formation of the single crystal article, or after some deformation of the article during creep or other light deformation process. Other minor irregularities are also permitted within the scope of the term "single crystal". For example, small areas of high angle grain boundaries may be formed in various portions of the article, due to the inability of the single crystal to grow perfectly near corners and the like. Such deviations from a perfect single crystal, which are found in normal commercial production operations, are within the scope of the term single crystal as used herein. The single crystal blades are oriented preferably such that the crystallographic direction is aligned with the radial direction of the turbine rotor to obtain optimal creep resistance for the turbine blades. This is similar to the method used to orient directionally solidified blades, however, with only one grain. As used herein, the term "directionally solidified alloy" is an alloy in which columnar multiple grains may exist but each grain has a preferred direction or orientation close to the [001] direction that is aligned with the turbine rotor radial direction. The single crystal or directionally solidified turbine blades are exposed to the highest temperatures on the hybrid bonded turbine rotor, and the single crystal or directionally solidified alloys optimize stress rupture, thermo-mechanical, and oxidation life of the turbine blades. Suitable exemplary single crystal and directionally solidified alloys include, for example, nickel-based alloys with anisotropic material properties such as creep and Young's modulus. Polycrystalline equi-axed nickel-based alloys may also be used for forming the turbine blades according to exemplary embodiments. The turbine blades may alternatively be formed of other alloys, such as titanium aluminide polycrystalline blades, nickel aluminide polycrystalline blades (also referred to as the "second alloy"), or the like, and in alternate embodiments, the turbine blades may be forged or machined rather than cast.

In some embodiments, the turbine blades 124 may utilize a controlled secondary [010] or [100] crystallographic orientation as well as the primary [001] controlled radial orientation. For example, some turbine rotors may benefit from defining a secondary grain orientation [010] or [100] in the airfoil chordwise direction (from leading edge 18 to trailing edge 19) or in a similar direction to minimize thermo-mechanical fatigue stresses in the turbine rotor. Stress analyses are performed to determine the optimal secondary crystallographic orientation that results in optimal blade life, as is known to those skilled in the art.

In some embodiments, the turbine blades 124 further comprise an internal cooling circuit 150 (e.g., FIGS. 8 and 9). The internal cooling circuit comprises a cooling air supply feed channel 152 formed in the shank portion 14 and extending from an inlet opening 154 in a front face of the shank portion toward a rear face of the shank portion and a plurality of cooling passages 156 (dotted lines in FIG. 8) extending from the cooling air supply feed channel 152 to the airfoil 16, the cooling passages 156 communicating with outlet openings (not shown) that may be formed in the turbine blade. The internal cooling circuit brings cooling air discharged from the compressor through the front surface of the shank portion and up into the airfoil 16 above the bond plane 126 (as hereinafter described) to enable the cooling air to enter the airfoil for cooling. In accordance with exemplary embodiments, the position and shape of the inlet opening 154 are selectively determined to decrease heat flow to the bond plane 126 and to optimize the stress distribution in and around the bond plane 126. More specifically, the location of the inlet opening and cooling passages reduce heat flow down to the bond plane 126, thereby managing bond plane temperatures. The inlet opening 154 to the internal cooling circuit is located above the bond plane (that is above the live rim) to achieve maximum bond plane area, and the bond plane may protrude forward and/or aft axially and tangentially if necessary to further increase the bond plane area to minimize bond plane stress. The inlet opening in the front face of the shank portion of the turbine blade according to exemplary embodiments utilizes a forward air feed (and basically axial flow passage in the turbine blade) to enable the air passage to create a large thermal resistance in the remaining metal cross sectional area around the air passage for the heat conducting radially inward from the airfoil and platform to the bond plane, thereby reducing the temperature of the entire bond plane (inlet and non-inlet faces alike) for a more durable and robust configuration. As the heat from the turbine blade is conducted around the substantially symmetrical inlet opening 154, the pressure and suction side cross-sectional areas around the inlet opening choke down the heat flow from the airfoil, resulting in an overall lower peak bond plane temperature. The shape of the cooling air supply feed channel 152 and the inlet opening 154 are also selected to provide a more uniform stress distribution along the bond plane 126. To minimize the peak stress in the bond plane 126, the cross section of the feed channel 152 and the inlet opening 154 may be generally oval or racetrack in shape with the major axis in the radial direction and with the minor axis in the tangential direction. This enables the radial load in the turbine blade to more easily pass around the feed channel 152 and to spread out more uniformly across the bond plane area than would occur if using a cooling channel with a circular shaped cross-section. The exact shape and aspect ratio of the feed channel 152 and inlet opening 154 may be determined using stress analysis optimization as is known to those skilled in the art. In other embodiments, the cooling air inlet opening 154, cooling air supply feed channel 152, and the plurality of cooling passages 156 may be designed for an aft feed configuration where the cooling air enters the rotor from the aft side of the turbine rotor. In other embodiments, the hybrid bonded turbine rotor 110 may be uncooled.

Of course, in some embodiments, the method 10 may include both steps 35 and 45, including metallurgically bonding a compliant layer to both the disk 122 (layer 129) and the blade 124 (layer 127). These compliant layers 127 and 129 may be of the same or a similar material. Where they are the same, the bond plane 126 joins exactly the same materials, ensuring a robust bond. In still other embodiments, several layers of compliant layers with varying materials may be employed to transition from the blade 124 or disk 122 lugs to the final compliant layer composition. This may enable improved metallurgical bonding between the blade 124 and its final compliant layer or from the disk 122 lug to its final compliant layer.

The method 10 for manufacturing the hybrid bonded turbine rotor according to exemplary embodiments of the present invention continues by linear friction welding each turbine blade of the plurality of turbine blades to the turbine disk to form the bond plane at the selected radial position (step 50) (more particularly, linear friction welding the base of the shank portion of the turbine blade to the corresponding raised blade attachment surface 140 of the turbine disk). The linear friction welding step 50 forms a metallurgical bond between the turbine disk 122 compliant layer 129 and the turbine blade 124, the turbine blade 124 compliant layer 127 and the turbine disk 122, or between compliant layers 127 and 129, depending on the particular embodiment. Unlike the prior art, this invention employs compliant layers(s) in conjunction with LFW to fabricate a hybrid cooled turbine rotor comprising a polycrystalline or single crystal (SC) blade rim bonded to a high strength powder metal or forged (PM) hub. The compliant layer may be applied to the blade to provide a LFW interface material that better matches the plasticity of the disk material. Alternatively, the compliant layer may be applied to the disk lugs to provide a LFW interface material that better matches the plasticity of the blade material. Still another embodiment utilizes a compliant material that is metallurgically bonded to both the blade and disk lugs such that the LFW is exactly the same material. A significant benefit of this present invention is that it enables individual replacement of blades in the field, where damaged blades can be removed and a new blade bonded via LFW to the rotor.

The term "bond plane" includes a planar bond plane, a curved bond plane, or a conical bond plane. The metallurgical bonds in the hybrid bonded turbine rotor 110 form the continuous bond plane 126 (FIGS. 6A and 6B) that is above the live rim 130 of the turbine disk. As noted previously, the radial position of the bond plane is determined in step 20 based on thermal and stress optimizations to achieve maximum strength and life for the hybrid bonded turbine rotor. The selected radial position of the bond plane outboard of the live rim depends upon the stress and temperature in the area proximate the bond plane and the physical requirement that the base of the shank portion of the turbine blade is contoured to the outer surface (rim) of the turbine disk. The step of linear friction welding each turbine blade to the turbine disk is repeated until the plurality of turbine blades provided in step 40 are metallurgically bonded to the turbine disk (more particularly, to the corresponding raised blade attachments surfaces 140 thereof) at which point the entire linear friction welding operation is complete, thereby forming a "bonded assembly". The bond plane in the bonded assembly may be larger than contact bearing areas of conventional insertable blade turbine rotors. A larger bond plane area enables higher rotational speeds, increased cycle efficiency, and decreased specific fuel consumption. The bonded assembly includes the shank cavity 128 (e.g., FIG. 6A) between each pair of adjacent turbine blades (more particularly between shank portions of adjacent turbine blades as hereinafter described). The shank cavities reduce turbine rotor weight and turbine rotor inertia. The shank cavities 128 may be refined in a subsequent machining step as hereinafter described.

In general, as known to one skilled in the art, linear friction welding (LFW) is a solid state joining process in which a stationary part (here, the turbine disk) is forced against a part (here, the turbine blade) that is reciprocating in a linear manner in order to generate frictional heat. The reciprocating motion may be along any direction that does not interfere with adjacent blades. The direction of reciprocating motion may be generally parallel to the platform angle, which is substantially parallel with the platform tangential edges (that extend outward from the airfoil pressure side 24 root and from the airfoil suction side 22 root) to maintain a constant gap 157 between adjacent blade platforms 13 of the circumferentially adjacent turbine blades. This is generally an axial direction from the front to the aft direction of the turbine blade along the blade platform angle (that is generally between 0 to 25 degrees from the axial direction) and enables the blade to freely reciprocate without contacting adjacent blades. In alternate embodiments, the direction of reciprocation may be axial, tangential, or in any direction that does not cause interference with adjacent blades. As noted previously, the oversized root stock around the blade platform of the turbine blade provides a clamping surface and additional space (relative to the space that would be provided by a turbine blade without the oversized root stock) for the LFW tooling to be disposed during the liner friction welding operation, between the individual turbine blade being bonded and the circumferentially adjacent individual turbine disk. The additional space enables easier and substantially unimpeded linear friction welding. The heat, along with the force applied perpendicular to the weld interface (i.e., the bond plane), causes material at the interface to deform and plasticise. Much of this plasticised material is subsequently removed from the weld, as flash, because of the combined action of the applied force and part movement. Surface-oxides and other impurities are removed, along with the plasticised material, and this allows metal-to-metal contact between the individual turbine blade or the turbine disk and the compliant layer, or between compliant layers, and allows a joint (the weld) to form at the bond plane. A defining feature of the linear friction welding process, along with all other friction welding processes, is that it takes place in the solid state and involves no melting of the parts to be joined. This means that linear friction welding offers advantages over fusion welding when joining metals that exhibit solidification problems (e.g., porosity, hot cracking, segregation etc.) In addition, in most cases the severe deformation in the weld region during linear friction welding results in a refined microstructure that can provide improved strength at the weld line relative to the parent material.

Using linear friction welding to metallurgically bond each turbine blade to the turbine disk with the assistance of one or more compliant layers provides several benefits to the hybrid bonded turbine rotor that may not be realized using conventional bonding techniques such as brazing or diffusion bonding. For example, LFW forms an improved metallurgical bond between single crystal (SC) turbine blades and the powdered metal (PM) turbine disk relative to conventional diffusion bonding or brazed approaches. Thus, this present invention utilizes LFW with compliant layer(s) to produce an optimal bond between the SC blades and the PM disk hub. Conventional diffusion and brazed approaches may form brittle phases such as carbides at the SC to PM bond line due to diffusion and elemental mixing enabled by the comparative long time exposure to high temperature. These precipitated phases formed from elemental mixing may lead to a brittle bond joint and a subsequent reduced allowable design temperature and stress. The LFW operation also results in only localized heating in the vicinity of the bond plane due to a very short thermal exposure that cools at a relatively fast rate after the weld is formed, thereby minimizing undesirable changes to the single crystal microstructure of the fully heat treated turbine blade and a solution heat treated hybrid bonded turbine rotor in the vicinity of the bond plane. Only a post-weld stress relief heat treatment is required that is compatible to function as a normal aging heat treatment cycle, enabling precipitation of desirable gamma prime second phase in the bond region and stress relief of weld residual stresses. Aging at a lower temperature for a longer time helps the microstructure, providing stronger alloy properties (e.g., improved creep strength, fatigue life, etc.). The localized heating from LFW enables both the turbine blade and turbine disk alloys to retain their bulk design microstructures including enabling dual microstructure turbine disks, where the rim has larger grains for creep while the bore has smaller grains for optimal LCF life and tensile/burst strength. Conventional diffusion bonding of single crystal turbine blades with the turbine disk requires a non-optimal heat treatment that weakens the properties of the SC turbine blades (lowering creep and tensile/burst strength) and also results in a sub-optimal turbine disk microstructure. Utilization of LFW also permits the option of applying a protective coating to the individual turbine blades prior to metallurgically bonding by LFW, as previously described. It is to be understood, however, that a protective coating may be applied to the metallurgically bonded turbine blades after LFW is complete, during a finishing step 80 as hereinafter described.

Exemplary embodiments of the present invention also enable individual replacement of turbine blades in the field, where damaged turbine blades can be removed and a new turbine blade linear friction welded to the turbine disk. More specifically, LFW offers easy reparability of the hybrid bonded turbine rotor, where a damaged turbine blade can be removed via Electro-Discharge Machining (EDM), and a replacement turbine blade metallurgically bonded to the turbine disk via LFW without compromising the optimized heat treat and metallurgical properties of the undamaged portion(s) of the hybrid bonded turbine rotor.

Method 10 for manufacturing the hybrid bonded turbine rotor according to exemplary embodiments of the present invention continues by machining the bonded assembly (step 60). The step of machining the bonded assembly (step 60) includes removing the flash from the weld (sub-step 60a), substantially removing the sacrificial turbine blade material (the oversized root stock) from the turbine blade(s) (sub-step 60b), and refining the shank cavities between adjacent turbine blades (sub-step 60c). The machining step results in a "machined bonded assembly."

The flash removal sub-step 60a comprises removing the flash from the weld via, for example, conventional electro-discharge machining (EDM). Flash removal proceeds radially below the bond plane for stress optimization. The electro-discharge machining can also return the live rim notches to an original determined stress-relieving configuration or the live rim notches may be formed in the flash removal step 60a, with the selected stress-relieving configuration. The flash removing step may be performed after each weld, after a plurality of welds, or after the entire linear friction welding operation is complete (i.e., after the plurality of turbine blades have been linear friction welded to the turbine disk), depending on blade spacing. If blades are closely spaced, it may be preferable to remove the flash after each weld so that linear friction welding may proceed without interference from a circumferentially adjacent turbine blade. In an alternate embodiment, the flash removing step may be performed after linear friction welding every other blade, and then again after linear friction welding the remaining alternate turbine blades, in which case the flash removal step is performed only twice on the bonded assembly, using only two flash cleanup machining set-ups.

The machining sub-step 60b of substantially removing the sacrificial turbine blade material forms the gap 157 (e.g., FIG. 6A) between adjacent blade platforms 13 of the circumferentially adjacent turbine blades. Sub-step 60b may be performed after each weld, after several welds, or after all turbine blades are welded to the turbine disk. Sub-step 60b may be performed either after or simultaneously with the flash removal sub-step 60a as previously described.

Sub-step 60c may be performed to refine the shank cavity between each pair of adjacent turbine blades (more particularly, between the shank portions of the plurality of turbine blades). Refinement of the shank cavity includes machining previously-formed live rim notches therein to a final shape and contour (the stress-relieving configuration) or forming the live rim notches with the stress-relieving configuration.

Referring again to FIG. 10, the method 10 for manufacturing the hybrid bonded turbine rotor according to exemplary embodiments of the present invention continues by disposing a platform seal 158 to bridge each gap 157 between the adjacent blade platforms 13 of the circumferentially adjacent turbine blades of the bonded assembly (step 65). Each platform seal is disposed between and held in place under blade platforms of circumferentially adjacent turbine blades. The platform seals may be as described in U.S. Pat. No. 8,070,448 by the same named assignee and incorporated herein by reference in its entirety or may be conventional seals. The platform seals may be self-sealing such that no additional machining of the turbine disk is required to hold them in place. The platform seals 158 substantially prevent hot combustion gas ingestion under the blade platforms 13 including into the shank cavities 128, thereby controlling heat near the bond plane 126, providing vibration damping, and allowing more physical space between circumferentially adjacent turbine blades, making linear friction welding thereof easier. In addition, the platform seals provide a flow path without aerodynamic disturbances along the circumferentially adjacent blade platforms.

After the LFW bonding and machining steps, the machined bonded assembly is heat treated (step 70). The heat treatment step relieves stresses in the bond plane region. The machined bonded assembly is heat treated based on the starting condition of the first and second alloys of the turbine disk and turbine blades provided respectively in steps 30 and 40. For example, if the starting turbine blades were fully heat treated (i.e., homogenization, solution heat treated, and precipitation aging heat treated) and the turbine disk was only solution heat treated, the post-weld (i.e., after step 50) heat treatment step 70 would include a precipitation heat treatment of the turbine disk, effectively strengthening the alloy of the turbine disk and the weld heat affected zone (HAZ), and also providing stress relief to the bond plane region. As another example, if both the first and second alloys (of the turbine disk and the turbine blades) were fully heat treated such that a fully heat treated turbine disk and turbine blades were provided respectively in steps 30 and 40, then the post-weld heat treatment step 70 may be at a precipitation heat treatment temperature as known in the art, for a reduced amount of time solely to stress relieve the bond plane region but age material in the HAZ that may have been re-solutioned. Although a complete resolution and age could be performed, this would defeat one of the LFW advantages as the grain sizes in the hybrid bonded turbine rotor would grow, reducing low cycle fatigue (LCF) behavior in the turbine disk hub. Solution heat treatments are performed by solution heat treating methods as are well known in the art.

Figure 6B:
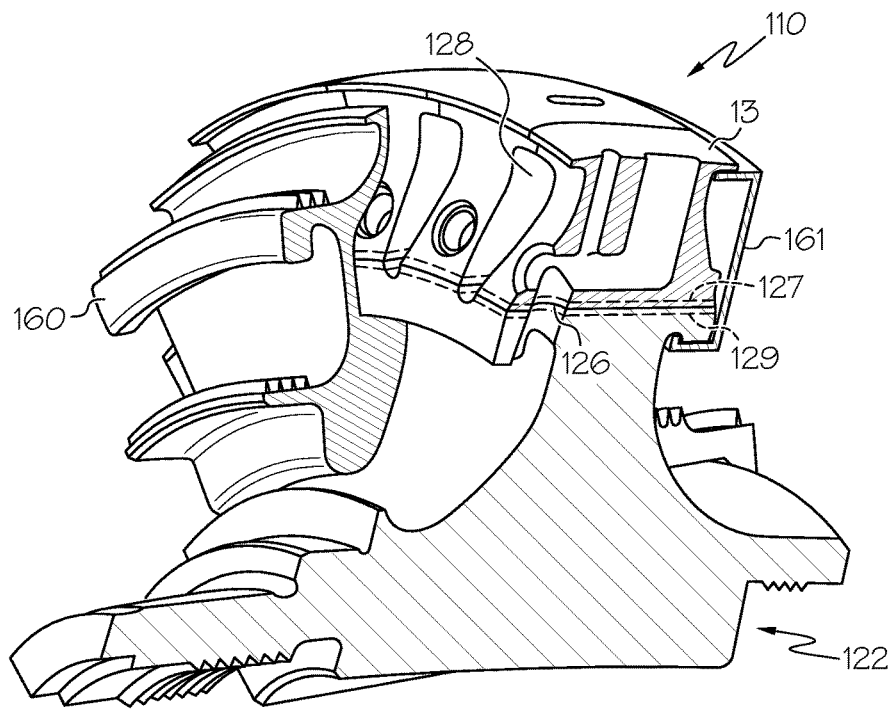
FIG. 6B is a partial perspective view of a portion of the hybrid bonded turbine rotor of FIG. 2, depicting forward and aft seal plates or rings mounted on the forward and aft surfaces thereof.

The method 10 for manufacturing the hybrid bonded turbine rotor according to exemplary embodiments of the present invention continues by finishing the heat treated machined bonded assembly (step 80). The heat treated machined bonded assembly may be finished by machining to the final configuration of the hybrid bonded turbine rotor, applying at least one protective coating as previously described, etc. Forward and aft seal plates (portions of the forward and aft seal plates 160 and 161 are depicted in FIG. 6B) may thereafter be mounted on the forward and aft surfaces of the hybrid bonded turbine rotor. As depicted in FIG. 6B, the forward seal plate or ring 160 is disposed adjacent to the front surface of the hybrid bonded turbine rotor 110 to form a flow cavity for directing cooling air to the cooling air supply feed channel 152.

From the foregoing, a hybrid bonded turbine rotor and methods for manufacturing the same are provided. The hybrid bonded turbine rotors according to exemplary embodiments of the present invention eliminate rotor failures due to turbine disk detachment and turbine blade walking, enable disk rim temperatures to safely operate at temperatures exceeding 1500° F. without using expensive chargeable cooling air, and enable increased T3 and T4.1 temperatures beyond the current state of the art to support future cycle requirements to achieve improved performance. The hybrid bonded turbine rotor according to exemplary embodiments of the present invention enables a reduction in specific fuel consumption and exhibits turbine rotor weight and cost reductions. The hybrid bonded turbine rotor according to exemplary embodiments of the present invention has an optimized microstructure, thereby optimizing the mechanical properties in the turbine disk bore for burst and fatigue, the disk rim for high temperature creep/fatigue, and the turbine blades for stress rupture, oxidation, and thermomechanical fatigue. Further, the use of one or more compliant material layers at the bond plane assist in LFW bonding between the different materials of the blades and disk.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A method for manufacturing a hybrid bonded turbine rotor comprising the steps of:
   providing a turbine disk having a rim portion comprising a live rim of circumferentially continuous material and a plurality of live rim notches in an outer periphery of the turbine disk alternating with a plurality of raised blade attachment surfaces defining the outer periphery, wherein the raised blade attachment surfaces comprise a first metal alloy;
   providing at least one turbine blade, the at least one turbine blade comprising an airfoil portion and a shank portion, the shank portion having a base surface, wherein the base surface of the blade shank comprises a second metal alloy;
   metallurgically bonding a compliant alloy material layer to either or both of one or more of the raised blade attachment surfaces of the turbine disk and the base surface of the blade shank, wherein the compliant alloy material layer is bonded only to the one or more of the raised blade attachment surfaces and not any other portion of the turbine disk, only to the base surface of the blade shank and not any other portion of the at least one turbine blade, or only to both the one or more of the raised blade attachment surfaces and the base surface of the blade shank and not any other portion of the turbine disk or the at least one turbine blade, wherein metallurgically bonding is selected from the group consisting of: solid state diffusion bonding with hot iso-static press (HIP), axial load vacuum furnace, transient liquid phase bonding, fusion cladding via tungsten inert gas (TIG) or metal inert gas (MIG), electron beam or laser welding, explosive bonding, high velocity oxygen fuel (HVOF), and plasma spray, and wherein the compliant alloy material layer comprises a third metal alloy; and
   subsequent to metallurgically bonding the compliant alloy material layer, linear friction welding the at least one blade to the turbine disk so as to form a bond plane between the one or more of the raised blade attachments surfaces of the turbine disk and the base surface of the blade shank, the compliant alloy material layer being disposed at the bond plane, wherein linear friction welding is performed so as to achieve a linear friction welding temperature at the bond plane that is sufficient to plasticize the third metal alloy,
   wherein the third metal alloy exhibits a yield strength at the linear friction welding temperature that is relatively closer to a yield strength of a material that is immediately opposite the bond plane from the third metal alloy as compared to a yield strength of the one or both of the first and second metal alloys to which the compliant alloy material layer was metallurgically bonded.

2. The method of claim 1, wherein the compliant alloy material layer is bonded only to the at least one turbine blade and not the turbine disk during the step of metallurgical bonding.

3. The method of claim 2, wherein the third metal alloy comprises a nickel-based or cobalt-based superalloy material.

4. The method of claim 3, wherein the third metal alloy is polycrystalline.

5. The method of claim 1, wherein the compliant alloy material layer is bonded only to the turbine disk and not the at least one turbine blade during the step of metallurgical bonding.

6. The method of claim 5, wherein the third metal alloy comprises a nickel-base superalloy material.

7. The method of claim 6, wherein the third metal alloy is single crystal aligned with a (001) direction of the blade alloy.

8. The method of claim 1, wherein the compliant alloy material layer is bonded to both the at least one turbine blade and to the turbine disk during the step of metallurgical bonding.

9. The method of claim 8, wherein the compliant alloy material layer bonded to the at least one turbine blade and the compliant alloy material layer bonded to the turbine disk both comprise the third metal alloy.

10. The method of claim 8, wherein only one of the compliant alloy material layer bonded to the at least one turbine blade or the compliant alloy material layer bonded to the turbine disk comprises the third metal alloy.

11. The method of claim 1, wherein providing the at least one turbine blade comprises providing a single-crystal nickel-based super-alloy blade.

12. The method of claim 1, wherein providing the turbine disk comprises providing a powder metal nickel-based super-alloy disk.

13. The method of claim 2, wherein the compliant alloy material layer consists of, in its entirety, the third metal alloy.

\* \* \* \* \*